United States Patent
Ohkubo et al.

(10) Patent No.: US 7,274,982 B1
(45) Date of Patent: Sep. 25, 2007

(54) VEHICLE MOTION CONTROL SYSTEM

(75) Inventors: Naoto Ohkubo, Saitama (JP); Osamu Yamamoto, Saitama (JP); Yuki Ito, Saitama (JP); Hiromi Inagaki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/709,316

(22) Filed: Feb. 21, 2007

(30) Foreign Application Priority Data

Mar. 17, 2006 (JP) .............................. 2006-074602

(51) Int. Cl.
*A01B 69/00* (2006.01)
(52) U.S. Cl. .............................. 701/41; 701/42; 701/72
(58) Field of Classification Search ................. 701/36, 701/37, 38, 41, 42, 70, 72, 78; 180/252, 180/282, 244
See application file for complete search history.

(56) References Cited

U.S. PATENT DOCUMENTS 5,799,745 A * 9/1998 Fukatani ..................... 180/410
7,136,730 B2 * 11/2006 Lu et al. ........................ 701/36
7,143,864 B2 * 12/2006 Mattson et al. ............. 180/446
7,165,644 B2 * 1/2007 Offerle et al. .............. 180/244

FOREIGN PATENT DOCUMENTS

JP 3324965 7/2002

* cited by examiner

*Primary Examiner*—Richard M. Camby
(74) *Attorney, Agent, or Firm*—Carrier, Blackman & Associates, P.C.; Joseph P. Carrier; William D. Blackman

(57) ABSTRACT

A vehicle motion control system is provided. In a first state requiring understeer suppressing control, a controller determines, based on a yaw rate deviation, a first control amount of an actuator selected so as to generate an inward turning moment a vehicle. In a second state requiring spin suppressing control, the controller determines, based on the sideways slip angular velocity, a second control amount of an actuator selected so as to generate an outward turning moment in the vehicle. When the first and second states are concurrent, the controller selects an actuator to be controlled by the larger of the absolute values of first and second cooperative control amounts, and determines a control amount of the selected actuator as the sum of the first and second cooperative control amounts. Accordingly, the understeer suppressing control and the spin suppressing control can be performed in parallel, improving control performance.

6 Claims, 4 Drawing Sheets

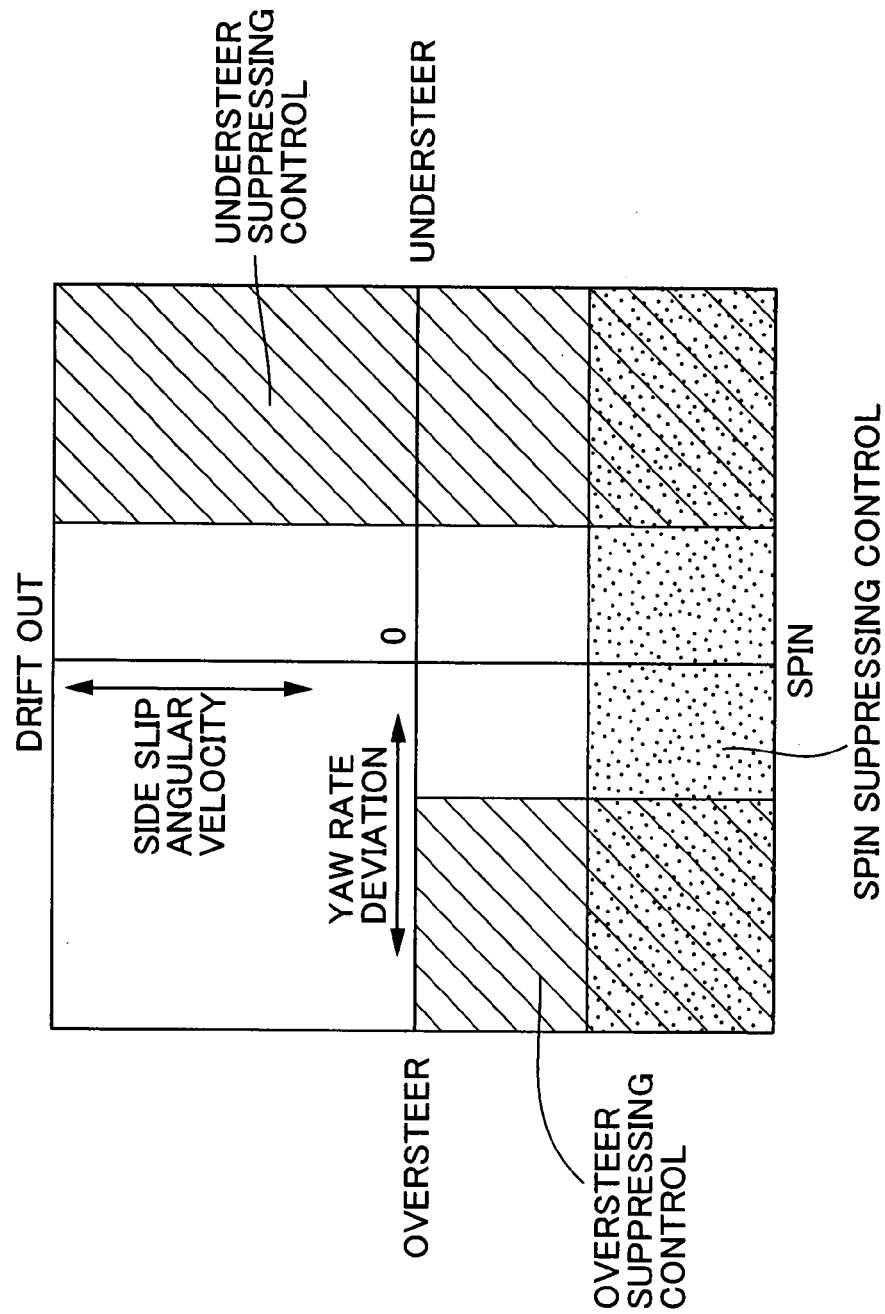

VEHICLE MOTION CONTROL SYSTEM

CROSS-REFERENCE TO RELATED APPLICATION

The present invention claims priority under 35 USC 119 based on Japanese patent application No. 2006-74602, filed on Mar. 17, 2006. The subject matter of this priority document is incorporated by reference herein.

BACKGROUND OF THE INVENTION

1. Field of the Invention

The present invention relates to a vehicle motion control system, and particularly to a vehicle motion control system capable of performing, in parallel, motion control based on yaw rate and motion control based on sideways slip angular velocity.

2. Description of the Related Art

Japanese Patent No. 3324965 discloses a vehicle motion control system which performs motion control based on a yaw rate deviation between a reference yaw rate determined based on a steering angle and a vehicle speed, and a detected yaw rate, when the vehicle turns in an understeer state. In addition, the vehicle motion control system performs motion control based on a sideways slip angular velocity when the vehicle turns in an oversteer state.

The oversteer suppressing control, the understeer suppressing control and the spin suppressing control of a vehicle are performed according to yaw rate deviation and sideways slip angular velocity in respective regions illustrated in FIG. 4. In the figure, there is a region where motion control based on yaw rate deviation and motion control based on sideways slip angular velocity overlap each other. Particularly, in a region where understeer suppressing control for suppressing understeer based on yaw rate deviation and spin suppressing control based on sideways slip angular velocity overlap each other, the directions of turning moment required in these controls are opposite to each other. Accordingly, when the understeer suppressing control for suppressing understeer based on yaw rate deviation and the spin suppressing control based on sideways slip angular velocity are performed in parallel to generate a turning moment, either an inward turning moment or an outward turning moment is generated depending on the situation. Thus, the driver of the vehicle has difficulty in predicting whether the motion controls will proceed in a turn accelerating direction or a turn suppressing direction, resulting in a deterioration in vehicle control performance.

SUMMARY OF THE INVENTION

The present invention has been achieved in view of the above circumstances, and has as an object to provide a vehicle motion control system which can perform, in parallel, understeer suppressing control based on yaw rate deviation and spin suppressing control based on sideways slip angular velocity, and which can improve control performance.

In order to achieve the above object, according to a first feature of the present invention, there is provided a vehicle motion control system comprising: a steering angle detecting device for detecting a steering angle input by a driver; a vehicle speed detecting device for detecting a vehicle speed; a yaw rate detecting device for detecting a yaw rate of a vehicle; a sideways slip angular velocity detecting device for detecting a sideways slip angular velocity of the vehicle; a reference yaw rate calculating device for calculating a reference yaw rate intended by the driver based on the steering angle detected by the steering angle detecting device and the vehicle speed detected by the vehicle speed detecting device; a yaw rate deviation calculating device for calculating a yaw rate deviation being a deviation between the reference yaw rate calculated by the reference yaw rate calculating device and the yaw rate detected by the yaw rate detecting device; and a control amount determining device which, based on the value detected by the sideways slip angular velocity detecting device and the value calculated by the yaw rate deviation calculating device, selects an appropriate actuator from plural actuators each generating a turning moment in the vehicle, and which determines a control amount of the selected actuator. In a first state where the absolute value of the reference yaw rate is larger by a predetermined value or more than the absolute value of the detected yaw rate, the control amount determining device selects, based on the yaw rate deviation calculated by the yaw rate deviation calculating device, one of the actuators which generates an inward turning moment in the vehicle, and determines a first control amount of the selected actuator. In addition, in a second state where the absolute value of the sideways slip angular velocity detected by the sideways slip angular velocity detecting device exceeds a predetermined value, the control amount determining device selects, based on the sideways slip angular velocity, one of the actuators which generates an outward turning moment in the vehicle, and determines a second control amount of the selected actuator. When the first and second states occur at the same time, the control amount determining device separately determines a first cooperative control amount and a second cooperative control amount based on the first control amount and second control amount having increase/decrease directions opposite to each other. In addition, the control amount determining device selects an actuator to be controlled by the larger of the first cooperative control amount and the second cooperative control amount, and determines a control amount of the selected actuator as the sum of the first cooperative control amount and the second cooperative control amount.

With the first feature, when the first state, in which the absolute value of the reference yaw rate is larger by a predetermined value or more than the absolute value of the yaw rate detected by the yaw rate detecting device, i.e., the state where the understeer suppressing control is required, occurs concurrently with the second state, in which the absolute value of the sideways slip angular velocity exceeds a predetermined value, i.e., the state where the spin suppressing control is required, then the absolute value of the first cooperative control amount dependent on the first control amount for generating an inward turning moment based on the yaw rate deviation is compared with the absolute value of the second cooperative control amount dependent on the second control amount for generating an outward turning moment based on the sideways slip angular velocity. Based on the comparison, the actuator to be controlled by the larger of the first cooperative control amount and the second cooperative control amount is selected, and the control amount of the selected actuator is determined as the sum of the first and second cooperative control amounts. Accordingly, in a state where both the understeer suppressing control and the spin suppressing control are required, the inward turning moment control and the outward turning moment control are prevented from interfering with each other, and thus the understeer suppressing control based on the driver's will is effected even during spin suppressing control, thereby improving control performance.

According to a second feature of the present invention, in addition to the first feature, the device further comprises a lateral acceleration detecting device for detecting a lateral acceleration of the vehicle. The predetermined value is set so as to vary in accordance with the lateral acceleration detected by the lateral acceleration detecting device.

The above-mentioned object, other objects, characteristics, and advantages of the present invention will become apparent from a preferred embodiment, which will be described in detail below by reference to the attached drawings.

BRIEF DESCRIPTION OF THE DRAWINGS

FIG. 4 is a graph of yaw rate deviation versus side slip angular velocity illustrating regions where oversteer suppressing control, understeer suppressing control and spin suppressing control are to be performed, respectively.

DETAILED DESCRIPTION

Figure 1:
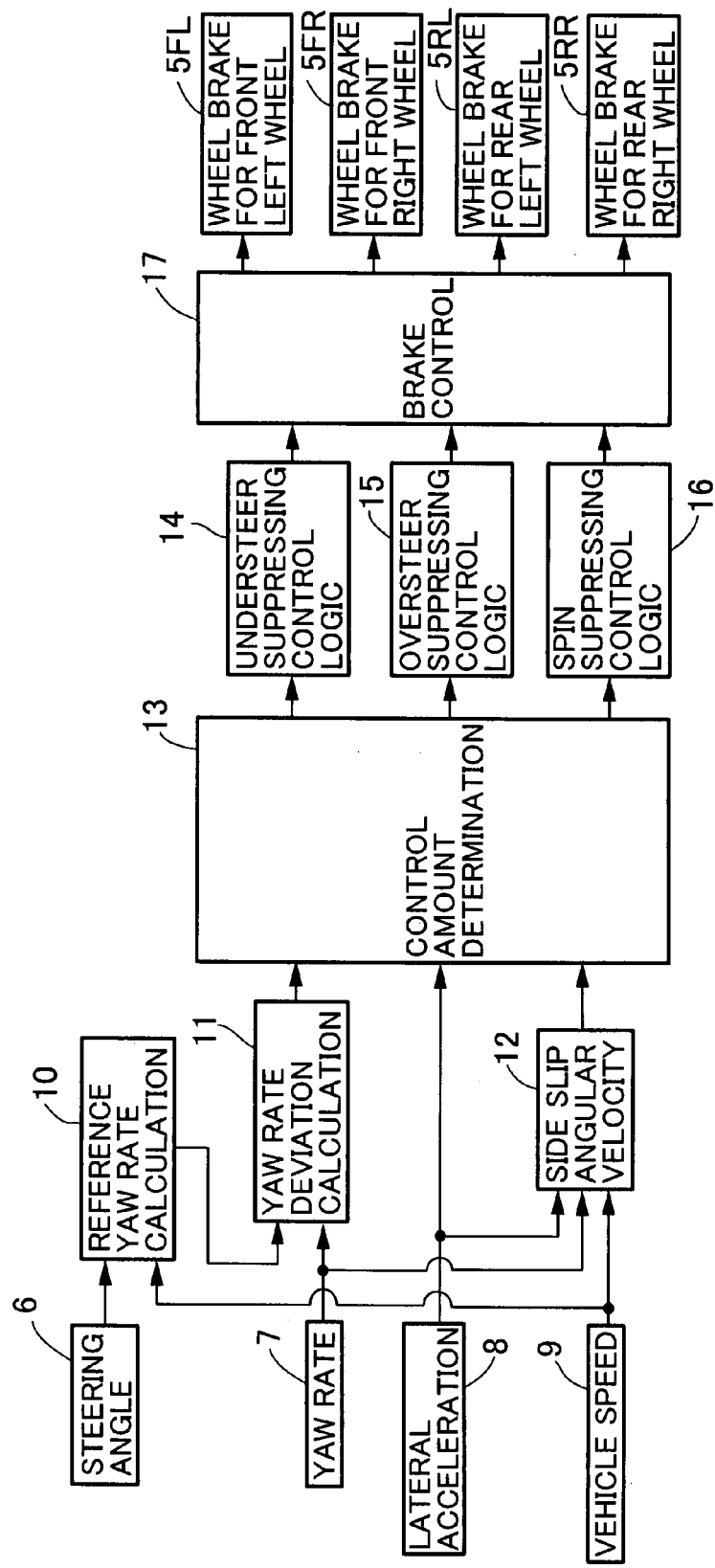
FIG. 1 is a block diagram illustrating a configuration of a motion control system according to an embodiment of the present invention.

First, referring to FIG. 1, a four-wheeled vehicle includes wheel brakes as actuators in the front/rear/left/right sides as follows: a front left wheel brake 5FL; a front right wheel brake 5FR; a rear left wheel brake 5RL and a rear right wheel brake 5RR. When motion control is performed during turning of a vehicle, the one of the wheel brakes 5FL to 5RR which is required for the motion control is selected, and the selected wheel brake performs a braking operation, thereby performing the motion control of the vehicle during turning.

When motion control of the vehicle is performed during turning, a steering angle input by the driver is detected by steering angle detecting device 6, a yaw rate of the vehicle is detected by a yaw rate detecting device 7, a lateral acceleration of the vehicle is detected by a lateral acceleration detecting device 8, and a vehicle speed is detected by a vehicle speed detecting device 9, for example, based on a speed of follower wheels.

The steering angle detected by the steering angle detecting device 6 and the vehicle speed detected by the vehicle speed detecting device 9 are input to a reference yaw rate calculating device 10. The reference yaw rate calculating device 10 calculates, based on the steering angle and the vehicle speed, a reference yaw rate intended by the driver. Further, the reference yaw rate calculated by the reference yaw rate calculating device 10 and the yaw rate detected by the yaw rate detecting device 7 are input to a yaw rate deviation calculating device 11. The yaw rate deviation calculating device 11 calculates a yaw rate deviation that is a deviation between the reference yaw rate and the detected yaw rate.

The yaw rate deviation calculating device 11 performs a procedure of assigning a positive sign to the reference yaw rate and detected yaw rate on a right turn side, and assigning a negative sign to the reference yaw rate and detected yaw rate on a left turn side, for example; and then subtracting the detected yaw rate from the reference yaw rate.

The yaw rate detected by the yaw rate detecting device 7, the lateral acceleration detected by the lateral acceleration detecting device 8, and the vehicle speed detected by the vehicle speed detecting device 9 are input to sideways slip angular velocity detecting device 12; and the sideways slip angular velocity detecting device 12 calculates a sideways slip angular velocity of the vehicle, for example, by subtracting the detected yaw rate from a value obtained by dividing the lateral acceleration by the vehicle speed.

The yaw rate deviation obtained by the yaw rate deviation calculating device 11, the lateral acceleration obtained by the lateral acceleration detecting device 8, and the sideways slip angular velocity obtained by the sideways slip angular velocity detecting device 12 are input to control amount determining device 13. The control amount determining device 13 selects, based on the yaw rate deviation, the lateral acceleration and the sideways slip angular velocity, one of the wheel brakes 5FL to 5RR which is required for generating a turning moment in the vehicle, and determines a control amount of the selected wheel brake.

Figure 2:
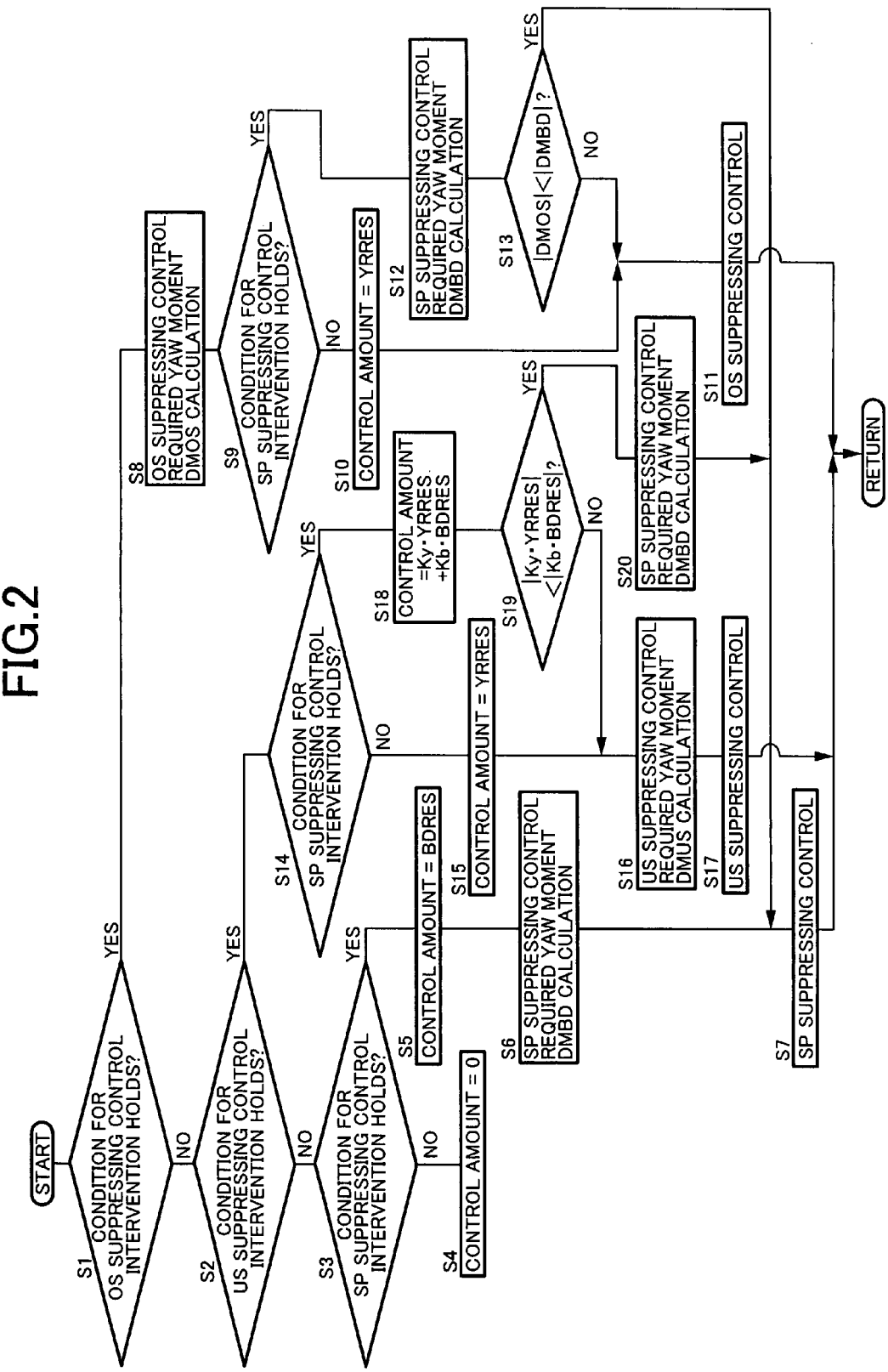
FIG. 2 is a flowchart illustrating a control amount determination procedure used by the control amount determining device.

The determining procedure in the control amount determining device 13 will be described with reference to FIG. 2. In FIG. 2, oversteer suppressing control based on yaw rate deviation is denoted as "OS suppressing control"; understeer suppressing control based on yaw rate deviation is denoted as "US suppressing control"; and spin suppressing control is denoted as "SP suppressing control".

In step S1, it is determined, based on the yaw rate deviation obtained by the yaw rate deviation calculating device 11, whether a condition for oversteer suppressing control intervention holds. Specifically, in the yaw rate deviation calculating device 11, the detected yaw rate obtained by the yaw rate detecting device 7 is subtracted from the reference yaw rate obtained by the reference yaw rate calculating device 10 to obtain a yaw rate deviation, and if the absolute value of the detected yaw rate is larger by a predetermined value or more than the absolute value of the reference yaw rate, it is determined that a condition for oversteer suppressing control intervention holds. That is, for example, when the yaw rate deviation has a predetermined value or more on the negative side during a right turn, or when the yaw rate deviation has a predetermined value or more on the positive side during a left turn, it is determined that a condition for oversteer suppressing control intervention holds. If it is determined that a condition for oversteer suppressing control intervention does not hold, the flow proceeds to step S2.

In step S2, it is determined based on the yaw rate deviation whether a condition for understeer suppressing control intervention holds. Specifically, if the absolute value of the reference yaw rate is larger by a predetermined value or more than the absolute value of the detected yaw rate, it is determined that a condition for understeer suppressing control intervention holds. For example, when the yaw rate deviation has a predetermined value or more on the positive side during a right turn, or when the yaw rate deviation has a predetermined value or more on the negative side during a left turn, it is determined that a condition for understeer suppressing control intervention holds. If it is determined that a condition for understeer suppressing control intervention does not hold, the flow proceeds to step S3.

Figure 3:
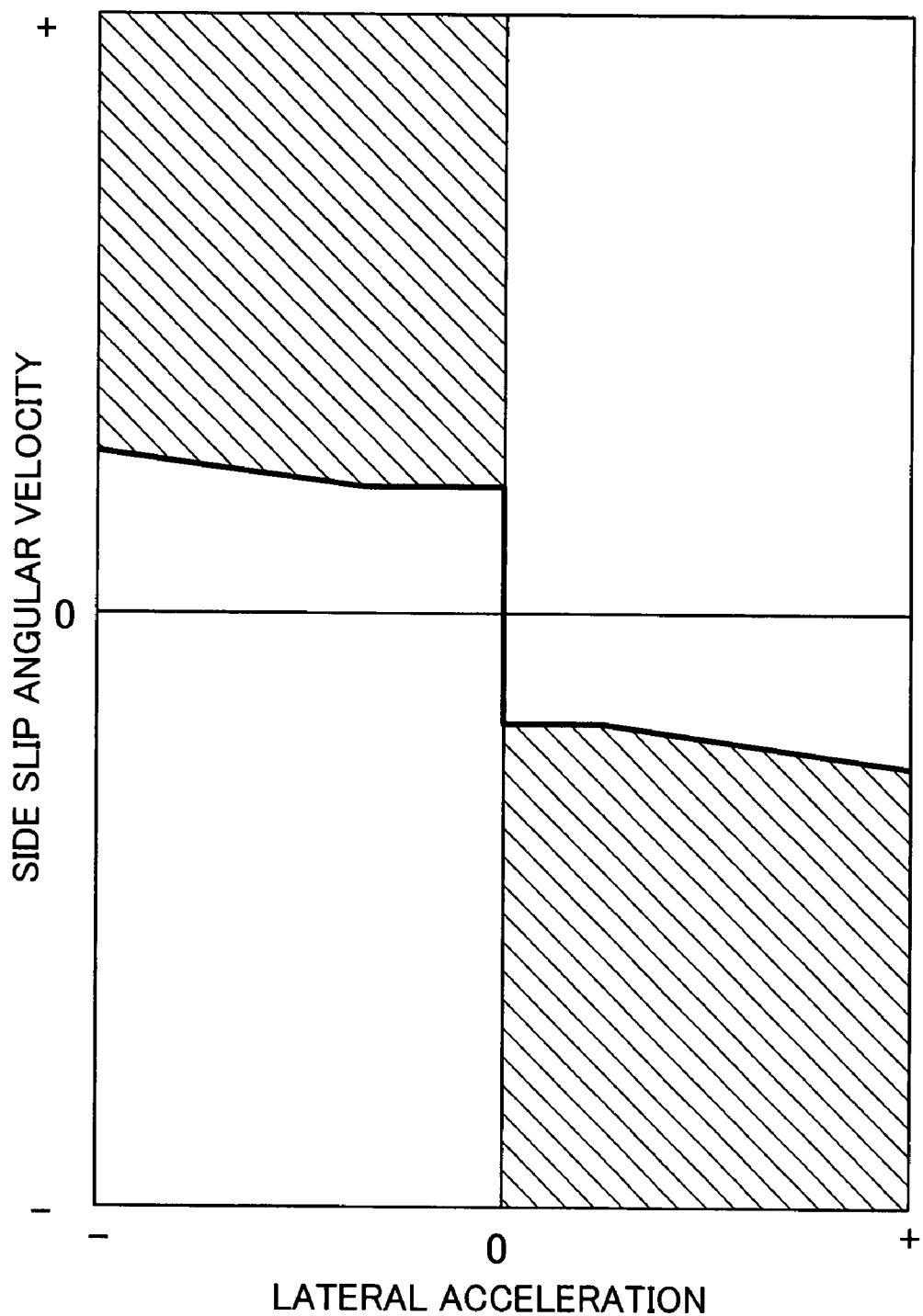
FIG. 3 is a graph of lateral acceleration versus side slip angular velocity, illustrating a predetermined value of sideways slip angular velocity for determining whether to perform control of generating an outward turning moment.

In step S3, it is determined whether the sideways slip angular velocity detected by the sideways slip angular velocity detecting device 12 exceeds a predetermined value, thereby determining whether a condition for spin suppressing control intervention holds. Here, as illustrated in FIG. 3, the predetermined value varies according to the lateral acceleration detected by the lateral acceleration detecting device 8. For example, when the right turn direction is set as "positive side" and the left turn direction, as "negative side", if a sideways slip angular velocity on the right turn side resides in a negative region (the region indicated by hatching) having a value smaller than the predetermined value arranged in the negative region, a condition for spin suppressing control intervention holds; and if a sideways slip angular velocity on the left turn side resides in a positive region (the region indicated by hatching) having a value larger than the predetermined value arranged in the positive region, a condition for spin suppressing control intervention holds.

If it is determined in the above step S3 that a condition for spin suppressing control intervention does not hold, the control amount is set to "0" in step S4. If it is determined that a condition for spin suppressing control intervention holds, the control amount is set to "BDRES" in step S5, and a required yaw moment DMBD in the spin suppressing control is calculated in the subsequent step S6, and the one of the wheel brakes (5FL to 5RR) which performs the spin suppressing control based on the sideways slip angular velocity and generates an outward turning moment in the vehicle, is selected in step S7.

If it is determined in step S1 that a condition for oversteer suppressing control intervention holds, the flow proceeds from step S1 to step S8. In step S8, a required yaw moment DMOS in the oversteer suppressing control is calculated. Subsequently, in step S9, it is determined whether a condition for spin suppressing control intervention holds, and if it is determined that a condition for spin suppressing control intervention does not hold, the control amount is set to YRRES in step S10. Thereafter, in step S11, oversteer suppressing control is selected, and one of the wheel brakes (5FL to 5RR) which generates an outward turning moment in the vehicle, is selected.

Alternatively, if it is determined in step S9 that a condition for spin suppressing control intervention holds, the flow proceeds to step S12. In step 12, a required yaw moment DMBD in the spin suppressing control is calculated, and thereafter in step S13, the absolute value |DMOS| of the required yaw moment DMOS in the oversteer suppressing control is compared with the absolute value |DMBD| of the required yaw moment DMBD in the spin suppressing control. As a result, if |DMOS|≧|DMBD|, the flow proceeds from step 13 to step S11, and if |DMOS|<|DMBD|, the flow proceeds from step 13 to step S7.

If it is determined in step S2 that a condition for understeer suppressing control intervention holds, i.e., if there has occurred the first state where the absolute value of the reference yaw rate is larger by a predetermined value or more than the absolute value of the detected yaw rate, then the flow proceeds from step S2 to step S14. In step S14 it is determined whether a condition for spin suppressing control intervention holds, i.e., whether the second state has occurred. If it is determined that a condition for spin suppressing control intervention does not hold, the first control amount is set to YRRES in step S15, and a required yaw moment DMUS in the understeer suppressing control is calculated in the subsequent step S16, and further one of the wheel brakes (5FL to 5RR) which performs understeer suppressing control based on the yaw rate deviation and generates an inward turning moment in the vehicle, is selected in step S17.

Alternatively, if it is determined in step S14 that a condition for spin suppressing control intervention holds, i.e., if it is determined that the first state where a condition for understeer suppressing control intervention holds and the second state where a condition for spin suppressing control intervention holds have occurred at the same time, then the flow proceeds to step S18. Here, the understeer suppressing control and the spin suppressing control generate moments in opposite directions, and therefore the direction of the first control amount YRRES being the control amount of the understeer suppressing control is opposite to that of the second control amount BDRES being the control amount of the spin suppressing control. Thus, in step S18, a first cooperative control amount Ky·YRRES and a second cooperative control amount Kb·BDRES are separately set, based on the first control amount YRRES and the second control amount BDRES, respectively, where Ky is an understeer suppressing control weighting coefficient and Kb is a spin suppressing control weighting coefficient. Then the sum (Ky·YRRES+Kb·BDRES) of the cooperative control amounts Ky·YRRES and Kb·BDRES is determined as the control amount.

Further, in the subsequent S19, it is determined which is larger between the absolute value |Ky·YRRES| of the first cooperative control amount Ky·YRRES and the absolute value |Kb·BDRES| of the second cooperative control amount. If |Ky·YRRES|≧|Kb·BDRES| the flow proceeds to step S16 to select understeer suppressing control, and if |Ky·YRRES|<|Kb·BDRES| a required yaw moment DMBD in spin suppressing control is calculated in step S20 and thereafter the flow proceeds to step S7 to select the spin suppressing control.

That is, in the control amount determining device 13, when there concurrently occur the first state where the absolute value of the reference yaw rate is larger by a predetermined value or more than the absolute value of the detected yaw rate, and the second state where the sideways slip angular velocity exceeds a predetermined value, then the absolute value of the first cooperative control amount Ky·YRRES based the first control amount YRRES determined in the first state is compared with the absolute value of the second cooperative control amount Kb·BDRES based on the second control amount BDRES determined in the second state. The one of the wheel brakes 5FL to 5RR which is to be controlled by the larger of the two absolute values is thereby selected, and the control amount of the selected wheel brake, as the sum (Ky·YRRES+Kb·BDRES) of the first and second cooperative control amounts Ky·YRRES and Kb·BDRES, is determined.

Referring again to FIG. 1, according to the selection of a wheel brake and the determination of a control amount in the control amount determining device 13, an understeer suppressing control logic circuit 14, an oversteer suppressing control logic circuit 15 and a spin suppressing control logic circuit 16 determine an operating amount of the one selected from among the wheel brakes 5FL to 5RR, and then a brake control circuit 17 controls the operation of the one selected from among the wheel brakes 5FL to 5RR in accordance with signals received from the logic circuits 14, 15 and 16.

The operation of the present embodiment will now be described. In the first state where the absolute value of the reference yaw rate is larger by a predetermined value or more than the absolute value of the detected yaw rate, the control amount determining device 13 selects, based on the yaw rate deviation calculated by the yaw rate deviation calculating device 11, one of the wheel brakes 5FL to 5RR which generates an inward turning moment in the vehicle, and determines the first control amount YRRES of the selected wheel brake. In the second state where the sideways slip angular velocity detected by the sideways slip angular velocity detecting device 12 exceeds a predetermined value, the control amount determining device 13 selects, based on the sideways slip angular velocity, a wheel brake which generates an outward turning moment in the vehicle, and determines the second control amount BDRES of the selected wheel brake. When the first and second states occur at the same time, the control amount determining device 13 selects a wheel brake to be controlled by the larger of the absolute values of the first and second cooperative control amounts Ky·YRRES and Kb·BDRES separately determined based on the first and second control amounts YRRES and BDRES having increase/decrease directions opposite to each other, and determines a control amount of the selected wheel brake as the sum (Ky·YRRES+Kb·BDRES) of the first and second cooperative control amounts.

According to the control amount determining device 13 described above, when the first state, i.e., the state requiring the understeer suppressing control, and the second state, i.e., the state requiring the spin suppressing control, occur at the same time, that is, under conditions requiring both the understeer suppressing control and the spin suppressing control, the inward turning moment control and the outward turning moment control are prevented from interfering with each other. As a result, the understeer suppressing control intended by the vehicle driver is reflected even during the spin suppressing control, thus improving control performance.

The embodiment of the present invention has been described above, but various changes in design may be made without departing from the subject matter of the present invention.

What is claimed is:

1. A vehicle motion control system comprising:
    plural actuators, each actuator configured to generate a turning moment in the vehicle;
    a steering angle detecting device which detects a steering angle input by a driver;
    a vehicle speed detecting device which detects a vehicle speed;
    a yaw rate detecting device which detects a yaw rate of a vehicle;
    a sideways slip angular velocity detecting device which detects a sideways slip angular velocity of the vehicle;
    a reference yaw rate calculating device which calculates a reference yaw rate intended by the driver based on the steering angle detected by the steering angle detecting device and the vehicle speed detected by the vehicle speed detecting device;
    a yaw rate deviation calculating device which calculates a yaw rate deviation, the yaw rate deviation comprising a deviation between the reference yaw rate calculated by the reference yaw rate calculating device and the yaw rate detected by the yaw rate detecting device; and
    a control amount determining device which, based on the value detected by the sideways slip angular velocity detecting device and the value calculated by the yaw rate deviation calculating device, is capable of selecting an appropriate actuator from the group of plural actuators, and which is capable of determining a control amount of the selected actuator,
    wherein in a first state in which an absolute value of the reference yaw rate is larger by a first predetermined value or more than an absolute value of the detected yaw rate, the control amount determining device selects, based on the yaw rate deviation calculated by the yaw rate deviation calculating device, one of the actuators which generates an inward turning moment in the vehicle, and determines a first control amount of the selected actuator,
    wherein in a second state in which an absolute value of the sideways slip angular velocity detected by the sideways slip angular velocity detecting device exceeds a second predetermined value, the control amount determining device selects, based on the sideways slip angular velocity, one of the actuators which generates an outward turning moment in the vehicle, and determines a second control amount of the selected actuator, and
    wherein when the first and second states occur at the same time, the control amount determining device
        determines separately a first cooperative control amount and a second cooperative control amount, based on the first control amount and second control amount having increase/decrease directions opposite to each other,
        selects an actuator to be controlled by the larger of the first cooperative control amount and the second cooperative control amount, and
        determines a control amount of the selected actuator as the sum of the first cooperative control amount and the second cooperative control amount.

2. The vehicle motion control system according to claim 1, further comprising a lateral acceleration detecting device which detects a lateral acceleration of the vehicle, wherein the second predetermined value varies in accordance with the lateral acceleration detected by the lateral acceleration detecting device.

3. The vehicle motion control system according to claim 1, wherein the first cooperative control amount comprises the first control amount multiplied by a first weighting coefficient, and
    the second cooperative control amount comprises the second control amount multiplied by a second weighting coefficient.

4. The vehicle motion control system according to claim 1, wherein the first state corresponds to an understeer suppression control state, and the first control amount corresponds to a control amount of an understeer suppressing control, and the second state corresponds to a spin suppression control state, and the second control amount corresponds to a control amount of a spin suppressing control.

5. The vehicle motion control system according to claim 1, further comprising a lateral acceleration detecting device which detects a lateral acceleration of the vehicle, wherein the sideways slip angular velocity detecting device calculates a sideways slip angular velocity of the vehicle by subtracting the detected yaw rate from a value obtained by dividing the detected lateral acceleration by the detected vehicle speed.

6. The vehicle motion control system according to claim 1, wherein each of the plural actuators comprises a wheel brake.

* * * * *